(12) United States Patent
Liu

(10) Patent No.: US 7,088,078 B2
(45) Date of Patent: Aug. 8, 2006

(54) SOFT-START CIRCUIT FOR POWER CONVERTERS

(75) Inventor: Chi Fai Liu, Yuen Long (HK)

(73) Assignee: Astec International Limited, Hong Kong (HK)

(*) Notice: Subject to any disclaimer, the term of this patent is extended or adjusted under 35 U.S.C. 154(b) by 0 days.

(21) Appl. No.: 10/860,907

(22) Filed: Jun. 4, 2004

(65) Prior Publication Data

US 2005/0270804 A1 Dec. 8, 2005

(51) Int. Cl.
*G05F 1/70* (2006.01)

(52) U.S. Cl. .................. 323/207; 323/222; 363/16; 363/24

(58) Field of Classification Search .......... 323/222, 323/207, 282–284, 272–274; 363/20, 37, 363/39, 79, 89, 17, 16, 24; 361/90, 94, 86, 361/91.1–91.7
See application file for complete search history.

(56) References Cited

U.S. PATENT DOCUMENTS

| | | | |
|---|---|---|---|
| 4,353,114 A | 10/1982 | Saleh | 363/21 |
| 4,598,351 A | 7/1986 | Fair et al. | 363/49 |
| 4,621,313 A | 11/1986 | Kiteley | 363/49 |
| 5,233,508 A | 8/1993 | Yamamura et al. | 363/49 |
| 5,798,635 A * | 8/1998 | Hwang et al. | 323/222 |
| 6,185,082 B1 * | 2/2001 | Yang | 361/90 |
| 6,377,480 B1 | 4/2002 | Sase et al. | 363/49 |
| 6,388,902 B1 | 5/2002 | Yasumura | 363/21.02 |
| 6,525,517 B1 | 2/2003 | Hojo et al. | 323/316 |
| 2003/0006744 A1 | 1/2003 | Bostrom | 323/283 |

OTHER PUBLICATIONS

Semiconductor Components Industries, NLAST4599, "Low Voltage Single Supply SPDT Analog Switch", 12 pages, Apr. 2001.
ST Microelectronics Data Sheet, L4981A L4981B, Power Factor Connector, 17 pages, Oct. 2000.

* cited by examiner

*Primary Examiner*—Rajnikant B. Patel
(74) *Attorney, Agent, or Firm*—Nixon Peabody LLP

(57) ABSTRACT

A soft-start circuit for a power converter including a switch controlled to cause the soft-start interval for the converter to be terminated when a predetermined condition is fulfilled. The predetermined condition is preferably the output voltage of the converter stabilizing at its normal operational level. The soft-start circuit detects when the predetermined condition is fulfilled and enables the converter to more rapidly recover after the initiation of a soft-start. In a preferred embodiment, the soft-start circuit includes a protection circuit for adjusting the soft-start voltage linearly as a function of the duration and magnitude of an overcurrent condition at the output so as to provide a scaled level of protection for the converter.

16 Claims, 5 Drawing Sheets

US 7,088,078 B2

SOFT-START CIRCUIT FOR POWER CONVERTERS

FIELD OF INVENTION

The present invention relates in general to soft-start and time-delayed startup circuits for power converters, and more particularly, to a soft-start circuit for a power converter that substantially and safely reduces the soft-start interval required before operation of the converter can resume after initiation of a soft-start.

BACKGROUND OF INVENTION

In the absence of a protective circuit, the instantaneous enabling of operation of a converter during startup can result in startup at maximum pulse width so as to cause a large current surge at the converter output. A restart of the converter after a power line disturbance, for instance, can also produce such potentially damaging current surges. The unsafe conditions need only persist at startup or restart for several milliseconds in order to cause damage to modern circuits, such as MOSFET switches, which depend on stable supply voltages.

One known way to protect a power converter during startup or restart of a power converter is to provide a "soft-start" circuit. Known soft-start circuits typically delay a complete startup of the power converter by linearly increasing a Pulse Width Modulator (PWM) pulse width until the output of the converter reaches a desired operational level. Such known soft-start circuits typically provide a delay from tens of milliseconds up to seconds before full operation of the converter can begin, or resume after a power line interruption.

FIG. 1 shows a schematic diagram of a prior art boost converter 10 that provides a soft-start feature. A rectified input line voltage $V_{in}$ from a conventional bridge rectifier (not shown) is applied at input terminals 2 and 4. The boost converter 10 includes a boost inductor 32, an electronic switch 30, a diode 34, and a PWM controller 28 to produce an output voltage across capacitor 40 connected between output terminals 6 and 8. The boost converter 10 uses a switching technique to boost the rectified input voltage to a regulated DC output voltage for delivery to a load (not shown) via terminals 6 and 8. Switch 30 is typically a FET having a control input that is connected to an output pin (GDRV) of PWM controller 28. PWM controller 28 has a voltage feedback input pin (VFB) to which is applied a voltage from a voltage divider formed by series resistors 36 and 38 connected across the output terminals 6 and 8. PWM controller 28 compares the divided output DC voltage to a reference voltage input (not shown) to maintain the desired regulated output DC voltage. The PWM controller may alternatively provide a power factor correction feature (not shown) for converter 10. One exemplary PWM controller for use in converter 10 is manufactured by STMicroelectronics under their reference L4981. Other suitable controller devices are available from other manufacturers.

PWM controller 28 includes a soft-start (SS) terminal for a soft-start mode. The soft-start mode for the PWM controller 28 is designed to avoid current overload on the switch during the ramp-up of the output boosted voltage. Converter 10 includes a soft-start protection circuit 50 that typically comprises a soft-start capacitor 12. PWM controller 28 includes an internal current generator (not shown) that, along with the soft-start capacitor 12, defines a soft-start time constant. In this way, the PWM controller 28 generates a soft-start voltage at the soft-start terminal. The soft-start voltage at the soft-start terminal increases linearly at startup until a predetermined threshold is reached, at which point the soft-start mode inside the PWM terminates.

FIG. 2 illustrates waveforms for the operation of the soft-start feature for the circuit shown in FIG. 1. Trace A is a waveform showing the "Start Signal" which indicates a start or restart of the converter prior to a soft-start interval. Trace B is a waveform showing the soft-start voltage Vss, also referred to as the "SS voltage", across the soft-start capacitor 12 in FIG. 1. The SS voltage ramps up according to a time constant defined typically by the PWM internal current generator (not shown) and the soft-start capacitor 12. Trace C is a waveform showing the voltage at the output terminals 6 and 8. The soft-start voltage increases linearly until a predetermined threshold is reached, at which point the soft-start mode inside the PWM switches off. The soft-start time for the known circuit in FIG. 1 is typically on the order of tens of milliseconds. Trace D is a waveform showing the "OK Signal" that, when active indicates the predetermined threshold has been reached. The "OK signal" thus signals when full operation of the converter is enabled to resume.

A drawback of known soft-start circuits is that the soft-start time is much longer than necessary for indicating that an adequate output voltage has been established. As can be seen in Traces C and D in FIG. 2 as an example, the output voltage would have stabilized well before the threshold of the SS voltage has been reached. Users are also increasingly demanding that their devices powered from a power converter be available sooner after startup or restart of the converter. Even a soft-start time of tens of milliseconds fails to meet the needs of users who are demanding maximum availability and therefore minimum down time for critical applications. Users also demand that protection be provided against damage to their devices during startup and during restart of the converter after power line disturbances.

A circuit is therefore needed to significantly reduce the soft-start time while providing the required circuit protection.

SUMMARY OF THE INVENTION

The present invention overcomes the drawbacks of known circuits by providing a soft-start circuit that reduces the soft-start time delay by switching off the soft-start capacitor as soon as the condition for full output is detected. According to one aspect of the present invention, a secondary soft-start with a faster ramp is made available, as needed, after startup to provide protection if momentary power glitches occur during the startup or restart sequence.

Broadly stated, in a power converter having two input terminals to which an input voltage is coupled and two output terminals where an output DC voltage is provided, the converter having a switch and a PWM controller having an output which controls the state of the switch, the PWM controller having a soft-start terminal on which a soft-start voltage is present for limiting current in the switch for a predetermined soft-start interval during a start or restart of the converter, the present invention provides a soft-start circuit coupled to the PWM controller soft-start terminal for controlling the soft-start interval as a function of the output voltage comprising a first detection circuit for detecting a predetermined condition of the converter and providing a signal indicative of the predetermined condition; and a circuit coupled to the PWM controller soft-start terminal for limiting the duration of the predetermined soft-start interval when the detected predetermined condition is active for a predetermined period of time.

According to one embodiment, the present invention provides a soft-start circuit for a boost converter; the boost converter having a switch, an inductor, a diode, a soft-start capacitor, two input terminals to which an input DC voltage is coupled and two output terminals where the output DC voltage is provided and a PWM controller for controlling a duty cycle of the switch that includes a soft-start mode and a corresponding soft-start input terminal on which a soft-start voltage is present for limiting current in the switch for a predetermined soft-start interval during a start or restart of the converter. The soft-start circuit comprises a first detection circuit for detecting a predetermined condition of the converter and providing a signal indicative of the predetermined condition; and a control circuit coupled to the PWM controller soft-start terminal for limiting the duration of the predetermined soft-start interval when the detected predetermined condition is active for a predetermined period of time.

The present invention has the advantage of terminating the normal soft-start delay period as soon as a predetermined condition is fulfilled.

Another advantage of the present invention is that it provides protection during the soft-start period for devices connected to the power converter, while also minimizing the down time of the power converter.

Another advantage of the present invention is that it enables a converter to more quickly reach a readiness state after startup or restart.

Another advantage of the present invention is that, in a preferred embodiment, the level of protection during the soft-start period is scaled automatically and linearly depending on the severity of any power line disturbance occurring during the soft-start interval such that a predetermined, optimized, and controlled level of protection is provided.

BRIEF DESCRIPTION OF THE DRAWINGS

The foregoing aspects and the attendant advantages of the present invention will become more readily appreciated by reference to the following detailed description, when taken in conjunction with the accompanying drawings, wherein.

DETAILED DESCRIPTION OF THE INVENTION

Figure 1:
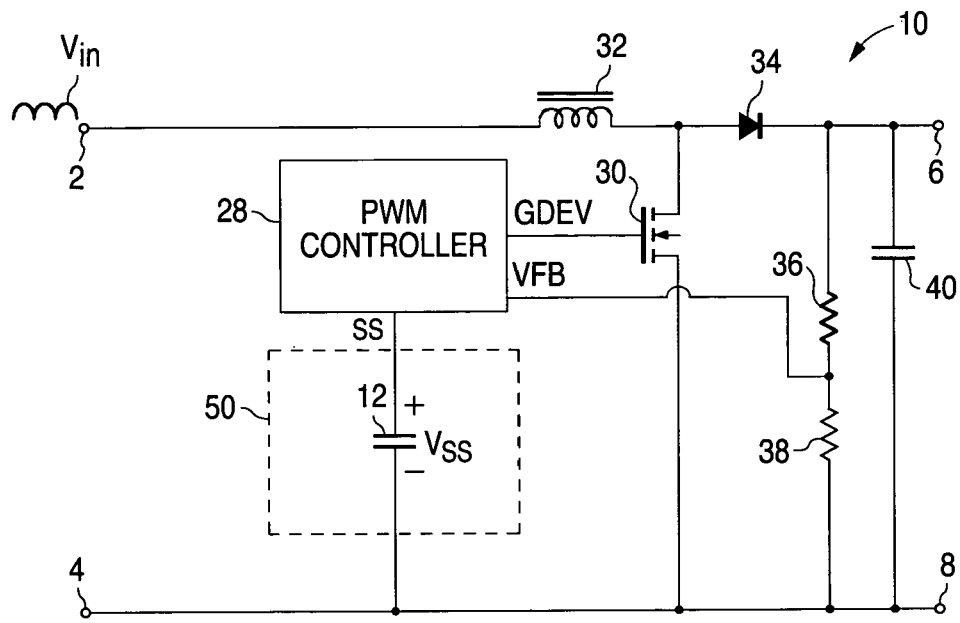
FIG. 1 shows an schematic diagram of a prior art boost converter that provides a soft-start feature.
Figure 2:
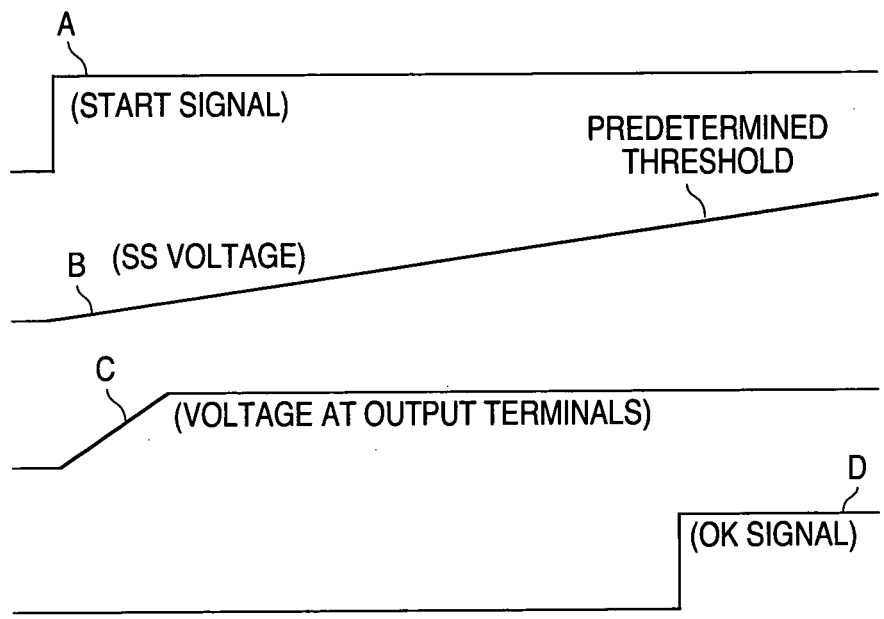
FIG. 2 shows waveforms illustrating the operation and timing of the soft-start feature for the circuit shown in FIG. 1.
Figure 3:
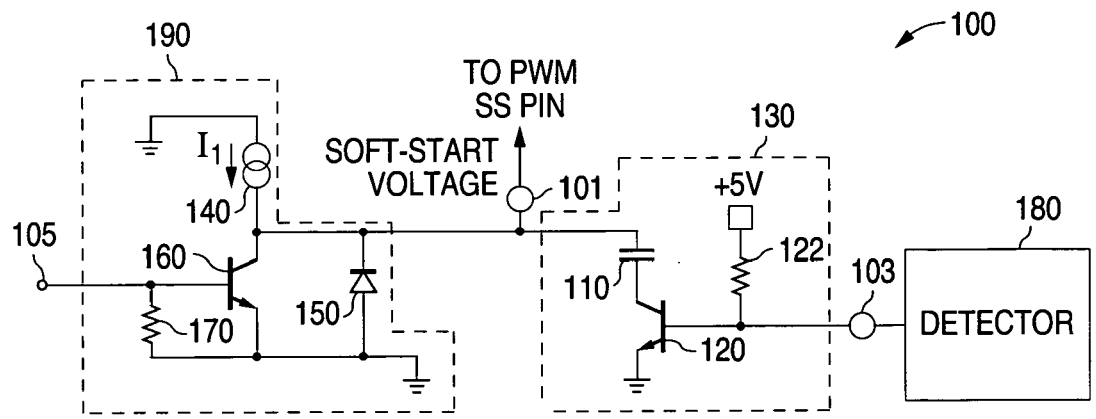
FIG. 3 is a schematic diagram of a soft-start circuit according to one embodiment of the present invention wherein a switch is controlled so as to terminate the soft-start delay period when a predetermined condition is fulfilled.

FIG. 3 is a schematic diagram of a soft-start circuit 100 according to one embodiment of the present invention wherein a switch is controlled so as to terminate the soft-start delay period when a predetermined condition is fulfilled. Soft-start circuit 100 includes a control circuit 190 and a soft-start protection circuit 130. Soft-start circuit 100 replaces the soft-start circuit 50 shown in FIG. 1 for the converter 10. For simplicity of explanation, the soft-start circuit 100 of the present invention is described as connected to the soft-start terminal of PWM controller 28 in FIG. 1 in place of soft-start circuit 50. The soft-start terminal (SS) of the PWM controller 28 is coupled to a node 101 of soft-start circuit 100. The present invention may be used in any power converter having a suitable soft-start mode and is not limited to use in boost converters.

Soft-start circuit 100 includes a capacitor 110 connected between a node 101 and a switch 120. Switch 120 is connected between capacitor 110 and ground. Switch 120 has a control input connected to a node 103. The node 103 is set inactive (low) when a predetermined condition is satisfied. The predetermined condition is preferably generated when the output voltage of the converter stabilizes at its normal operational level. Switch 120 is preferably an NPN transistor. A resistor 122 is connected between VCC, preferably at +5V, and node 103 to provide pull-up for the signal at the control input of switch 120.

The control circuit 190 includes a zener diode 150, a switch 160, a bias resistor 170, and a current source 140. Diode 150 is connected between node 101 and ground. A signal at a node 105 indicates enabling of the operation when node 105 goes from a high state to a low state. That is, the signal becomes enabling when the initial startup of the converter commences and remains enabling so long as this node remains low. Current source 140 is connected to node 101. Switch 160 is preferably an NPN transistor connected between node 101 and ground. As seen in FIG. 3, switch 160 has a base connected to node 105, an emitter connected to ground, and a collector connected to node 101 and current source 140. Resistor 170 is connected across the gate and emitter of switch 160. Connected to node 103 is a detection circuit 180 that detects when a predetermined condition has been met. A signal indicating this event is coupled by detection circuit 180 to node 103. Preferably, the detected condition is the converter's output voltage reaching a predetermined level.

In operation, current $I_1$ from current source 140 charges up capacitor 110 when switch 160 is off and switch 120 is on. The maximum voltage on capacitor 110 is controlled by zener diode 150. On startup or restart when the signal on node 105 goes low, switch 160 goes off thereby causing current $I_1$ to begin charging capacitor 110. This begins the soft-start period. Switch 120 is still on, thereby continuing to couple the other side of capacitor 110 to ground. When detector 180 detects the predetermined condition, e.g., the output of converter 10 reaching a predetermined level, detector 180 outputs a signal to node 103 that causes switch 120 to turn off. This causes the soft-start voltage at node 101 to much more rapidly reach the voltage necessary to cause PWM controller 28 to begin normal operation.

Figure 4:
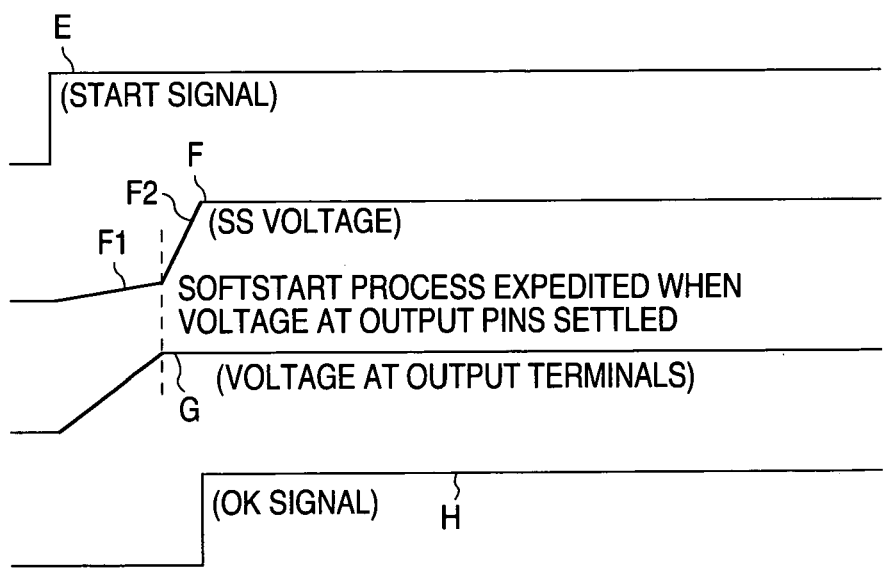
FIG. 4 shows waveforms illustrating the operation of the soft-start feature for the circuit shown in FIG. 3.

FIG. 4 shows waveforms illustrating the operation of the soft-start feature for the circuit shown in FIG. 3. Trace E is a waveform showing the "Start Signal" indicating a start or restart of a converter that includes the circuit in FIG. 3. Trace F is a waveform showing the soft-start voltage, SS voltage, for the circuit in FIG. 3, which is connected to the PWM soft-start terminal in a power converter 10. Trace G is a waveform showing the voltage at the output terminals of the power converter 10 in which the soft-start circuit 100 is used. Trace H is a waveform showing the "OK Signal" for the circuit in FIG. 3, that, when active, indicates the soft-start period has terminated and signals the end of the soft-start period at which point full operation of the converter resumes.

After the start signal, waveform E become active, the signal at node 103 is high indicating that the predetermined condition, such as the output voltage of the converter being stabilized at its normal operational level, is not met. With signal 103 active, the switch 120 is caused to be conducting such that one end of capacitor 110 is connected to ground. As seen in FIG. 4, Trace F illustrates that the SS voltage signal ramps at a slope F1 before the output voltage in Trace G has stabilized. Slope F1 is determined by the soft-start time constant which is a function of capacitor 110. Once the voltage at the output terminals stabilizes at an operational level as shown in waveform G, the signal at node 103 goes low causing switch 120 to turn off, i.e., become nonconducting. At this point, the SS voltage signal ramps at a steeper slope F2 causing the soft-start delay to be significantly reduced.

Figure 5:
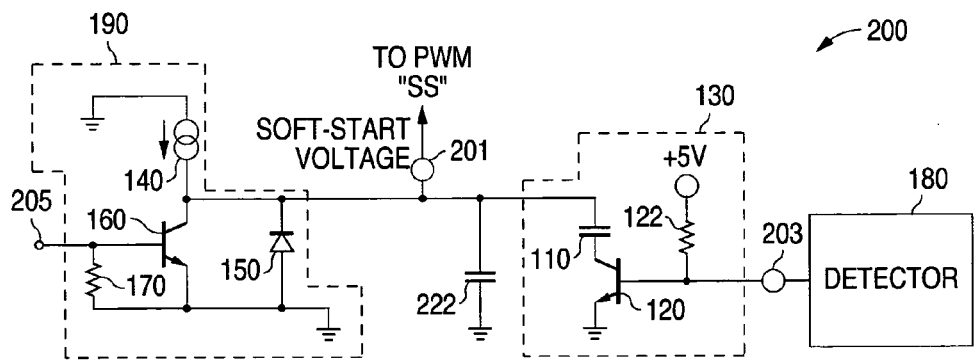
FIG. 5 is a schematic diagram of a soft-start circuit according an alternate embodiment of the present invention that includes the circuit of FIG. 3 as a first stage protection and adds a delay capacitor for providing a second stage protection.

FIG. 5 is a schematic diagram of a soft-start circuit 200 according an alternate embodiment of the present invention that includes the circuit of FIG. 3 as a first stage protection and adds a delay capacitor for providing a second stage protection. The input to circuit 190 in FIG. 5 is at a node 205. A signal at the node 205 indicates enabling of the operation when node 205 goes from a high state to a low state. That is, the signal becomes enabling when the initial startup of the converter commences, and remains enabling so long as this node remains low. In an exemplary application, soft-start circuit 200 replaces the circuit 50 shown in FIG. 1 for the converter 10. The soft-start circuit embodiment in FIG. 5 adds a soft-start stage with a steeper slope, that is, a faster ramp, to the soft-start circuit of FIG. 3. The control input of switch 120 is connected to a node 203. Capacitor 222 is connected between ground and node 201, the PWM soft-start terminal.

In operation, the node 203 in FIG. 5 is provided with a signal (not shown) that is normally active, thereby causing switch 120 to conduct, until the initial soft-start interval, i.e., at start or restart, is completed. During the initial soft-start interval, the slope of the ramp of the soft-start voltage at node 201 is a function of the discharge of capacitor 110 and capacitor 222. Once that initial soft-start is completed, the signal at node 203 becomes inactive causing switch 120 to stop conducting. The slope of the ramp of the soft-start voltage at node 201 is a function of the discharge of capacitor 222 only when switch 120 is non-conductive. A secondary soft-start interval may be triggered in the PWM after the initial soft-start has been completed, for example, due to a power glitch. For this secondary soft-start interval, the slope of the soft-start signal ramp is a function of the current source (not shown) in the PWM and capacitor 222. Capacitor 222 has a much smaller capacitance than for capacitor 110, such that the secondary soft-start signal has a much steeper slope, that is, a faster ramp, than for the initial soft-start interval. This faster ramp is particularly useful when the triggering of the secondary soft-start is caused by conditions which are only slightly unfavorable, such as small power glitches for which a full restart may not be necessary. The faster ramp provided by capacitor 222 for the secondary soft-start provides a temporary, momentary protection measure against momentary power line disturbances, as an alternative to shutting off the entire unit during such conditions.

Figure 6:
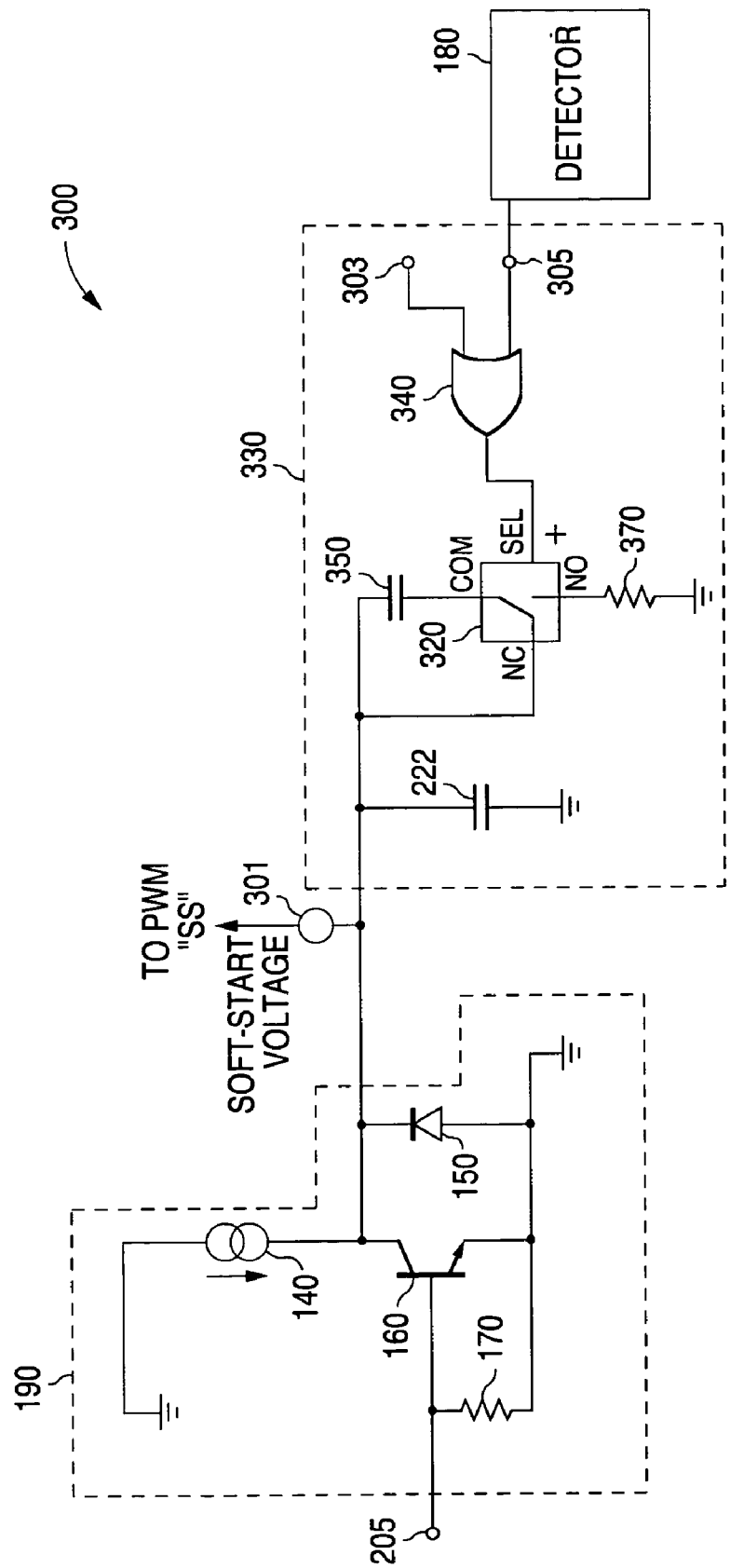
FIG. 6 is a schematic diagram of a soft-start circuit according to another embodiment of the present invention wherein the level of protection during the soft-start period is scaled automatically and linearly depending on the severity of any overcurrent condition detected at the output.

FIG. 6 is a schematic diagram of a soft-start circuit 300 according to another embodiment of the present invention wherein the level of protection during the soft-start period is scaled automatically and linearly depending on the severity of any overcurrent condition detected at the output. In an exemplary application, soft-start circuit 300 replaces the circuit 50 shown in FIG. 1 for the converter 10. The soft-start circuit 300 includes the control circuit 190 connected to a soft-start protection circuit 330 at a node 301. The node 301 is connected to the soft-start terminal of a PWM, such as the PWM controller 28 shown in FIG. 1.

The soft-start protection circuit 330 includes the capacitor 222, a resistor 370, a capacitor 350, a switch 320, and an OR gate 340. The switch 320 is preferably a single pole double throw ("SPDT") analog switch. An exemplary SPDT for performing this function is manufactured by ON semiconductor under their reference NLAST4599. Other suitable switches are available from other manufacturers. For simplicity of explanation, the circuit has been shown based upon the NLAST4599 SPDT switch. Switch 320 has a select ("SEL") pin, a common ("COM") pin, a normally-closed ("NC") pin, and a normally-open ("NO") pin. An input connected to the COM pin is connected to either the NC pin or NO pin as a function of the state of the input connected to the SEL pin. In a preferred embodiment, for the NLAST4599, the COM pin is connected to the NC pin if the SEL input is low or to the COM pin if the SEL input is high.

As seen in FIG. 6, capacitor 222 is connected between node 301 and ground. The NC pin of switch 320 is connected to node 301. Resistor 370 is a current limiting resistor connected between the NO pin of switch 320 and ground in the embodiment shown in FIG. 6. The output of OR gate 340 is connected to the SEL pin of switch 120. The OR gate 340 has two inputs. A node 303 is connected to one of the inputs of OR gate 340 and a node 305 is connected to the other input. The signal at node 303 is an alarm signal, as shown in waveform J in FIG. 8, which is high, to indicate an overcurrent condition. The signal at node 305 from detector 180 is high to indicate that the output voltage is not stabilized and low to indicate that the output voltage is stabilized.

In operation, under normal operating conditions at startup, the overcurrent signal at node 303 is low and the signal at node 305 is high indicating the output voltage has not stabilized. In this state, the OR gate 340 causes the SEL input to be high which causes switch 120 to switch the COM input to the NO input. As a result of the state of the switch 120, the SS voltage signal at node 301 is a ramp signal delaying the start of full operation of the converter. The signal at node 305 goes low when it is detected (not shown) that the output voltage has stabilized, which causes the SEL input to become low and cause switch 120 to connect the COM input to the NC pin, so as to turn off capacitor 350. The soft-start ramp is a function of the capacitance of capacitor 222 only when capacitor 350 is turned off. Capacitor 222 has a much smaller capacitance than capacitor 350 such that the SS voltage signal at node 301 ramps up with a steeper slope when capacitor 350 is turned off so as to rapidly terminate the soft-start interval.

Figure 8:
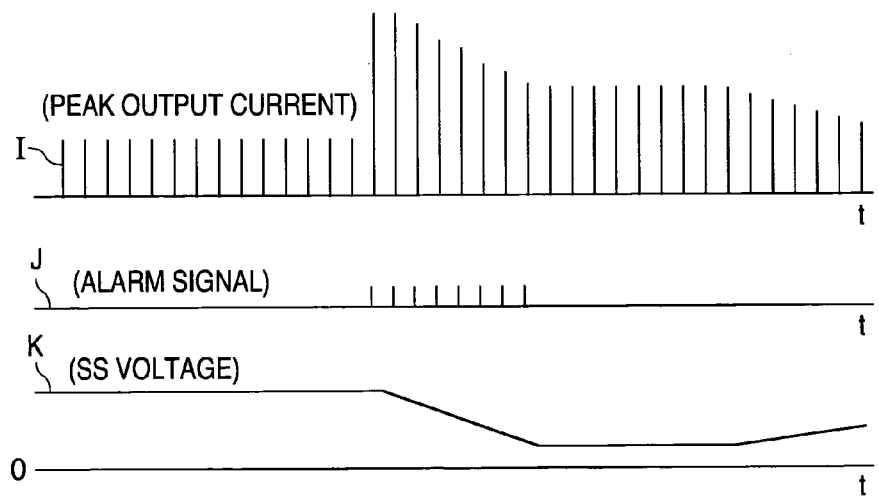
FIG. 8 shows waveforms illustrating the operation of the soft-start circuit of FIG. 7 for providing scaled protection under an overcurrent condition.

FIG. 8 shows waveforms illustrating the operation of the soft-start circuit of the present invention for providing scaled protection under an overcurrent condition. Waveform I illustrates a peak output current of the converter that is detected and sampled by a conventional overcurrent detection circuit (details not shown). Waveform J illustrates an overcurrent alarm signal which is coupled to node 303. Waveform K is the SS voltage at node 301 which is the SS pin for the PWM controller 28 of FIG. 1.

When the overcurrent condition occurs, the signal at node 303 becomes active, as shown in the alarm signal pulses of waveform J. The conventional overcurrent detection circuit set the alarm signal each time the sampled output current exceeds a predetermined threshold as seen in FIG. 8. In response to the initial overcurrent alarm signal pulse, the SEL input for switch 120 becomes active (high), which cause the COM input to be connected to the NO input connected to ground. With the COM input connected to the NO input, capacitor 222 is connected in parallel with capacitor 350 through resistor 370 which controls the rate of discharge.

Resistor 370 is a current limiting resistor of a predetermined value calculated to provide an optimized discharge current, which together with the discharge of the capacitor 222, provides protection against any undesirable condition during an alarm condition by quickly and progressively lowering the soft-start voltage so as to lower the operation power limits of the converter In circuit 300, switch 320 is arranged so that capacitor 222 may be progressively discharged in a controlled way by connecting it in parallel with capacitor 350 through the current limiting resistor 370. In this way, the level of protection provided by soft-soft circuit 300 is scaled automatically and linearly as a function of the severity of the alarm input, that is, the duration and repetitiveness of the alarm signal. As seen in waveform K in FIG. 8, the soft-start voltage is progressively lowered, by the circuit of the present invention as long as the overcurrent alarm persists so as to provide a controlled and optimized level of protection for the converter.

Figure 7:
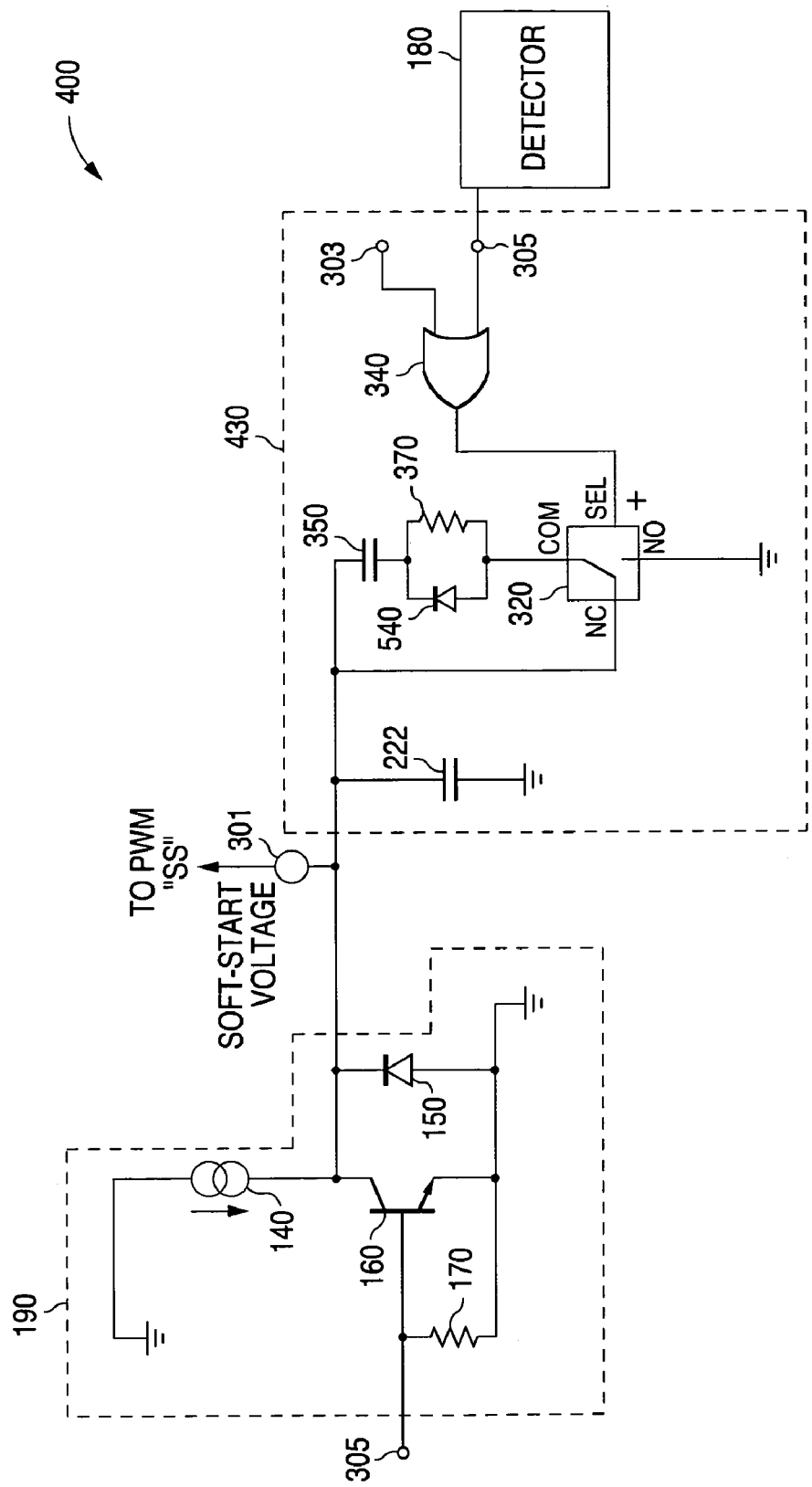
FIG. 7 is a schematic diagram of a soft-start circuit according to a preferred embodiment of the present invention wherein a diode is connected in parallel with a current limiting resistor to provide a more rapid return to normal converter operation after a soft-start has been initiated.

FIG. 7 is a schematic diagram of a soft-start circuit 400 according to a preferred embodiment of the present invention wherein a diode is connected in parallel with a current limiting resistor to provide the desired rapid return to normal converter operation after a soft-start has been initiated. In an exemplary application, soft-start circuit 400 replaces the circuit 50 shown in FIG. 1 for the converter 10. Soft-start circuit 400 includes a soft-start protection circuit 430 as an alternative arrangement of circuit 330 in FIG. 6. The soft-start protection circuit 430 includes a diode 540 connected in parallel with resistor 370. Either of these arrangements will enable capacitor 350 to be more quickly discharged completely after each alarm trigger pulse, ready for the next trigger. This discharge is needed to achieve a linearly proportionate protection, in terms of a lowered soft-start voltage, at node 301, according to the frequency and duration of any overcurrent alarm trigger pulse train as shown in waveform K.

Having disclosed exemplary embodiments, modifications and variations may be made to the disclosed embodiments while remaining within the scope of the invention as described by the following claims.

What is claimed is:

1. In a power converter having two input terminals to which an input voltage is coupled and two output terminals where an output DC voltage is provided, said converter having a switch and a pulse width modulator (PWM) controller whose output provides control of the state of said switch, said PWM controller enabling a soft-start voltage to be coupled thereto to provide a soft-start interval during which time the complete startup of said converter is delayed during a start or restart of said converter, a soft-start circuit coupled to said PWM controller for generating said soft-start voltage to control said soft-start interval as a function of a predetermined condition of said converter said comprising:
   a first detection circuit for detecting said predetermined condition of said converter and providing a signal indicative of said predetermined condition; and
   a circuit for generation said soft-start voltage so as to reduce the duration of said soft-start interval in response to said signal.

2. A soft-start circuit for a boost converter; said boost converter having a switch, an inductor, a diode, two input terminals to which an input DC voltage is coupled and two output terminals where the output DC voltage is provided and a pulse width modulator (PWM) controller for controlling a duty cycle of said switch, said PWM controller enabling a soft-start voltage to be coupled thereto to provide a soft-start interval during which time the complete startup of said converter is delayed during a start or restart of said converter; said soft-start circuit comprising:
   a first detection circuit for detecting a predetermined condition of said converter and providing a signal indicative of said predetermined condition; and
   a circuit coupled to said PWM controller for generating said soft-start voltage so as to reduce the duration of said soft-start interval in response to said signal.

3. The soft-start circuit of claim 2, wherein said predetermined condition is said output voltage reaching a predetermined level.

4. The soft-start circuit of claim 2, further comprising a second detection circuit for detecting an overcurrent condition at said output of said converter and providing an overcurrent alarm signal indicative of the duration and current level of said overcurrent condition.

5. The soft-start circuit of claim 4, wherein said circuit further includes a protection circuit for adjusting said soft-start voltage linearly as a function of the duration and amplitude, of said alarm signal, so as to provide a scaled level of protection for said converter.

6. The soft-start circuit of claim 3, where said circuit comprises:
   a switch having a control input connected a first node;
   a first capacitor connected in series with said switch between said soft-start terminal and ground; and
   a second capacitor connected between said soft-start terminal and ground;
   wherein said signal from said detection circuit is coupled to said first node such that said switch is turned off when said output voltage has reached said predetermined operational level.

7. The soft-start circuit of claim 6, wherein said first capacitor has a much smaller capacitance than said second capacitor such that said soft-start voltage has a steeper slope when said switch is turned off and said first capacitor is discharged such that the voltage on said first capacitor defines a ramp.

8. The soft-start circuit of claim 4, wherein said circuit comprises:
   a single pole double throw switch having a select input, a common terminal, a first terminal connected to said soft-start terminal, and a second terminal coupled to ground; said common terminal is connected to either said first terminal or said second terminal as a function of said select input, wherein said common terminal is connected to said first terminal when said select input is not active and to said second terminal when said select input is active;

a first capacitor connected in series with said switch between said soft-start terminal and ground;

a second capacitor connected between said soft-start terminal and ground;

an OR gate having an output connected to said select input of said single pole double throw switch and a first and a second input, said first input connected to a second node and said second input is connected to a third node;

wherein an alarm signal indicative of an overcurrent condition of said converter is connected to said first input of said OR gate, said alarm signal is active to indicate said overcurrent condition; and wherein said second input of said OR gate is connected to an indicator signal indicative of the state of said output voltage; wherein said indicator signal is inactive when said output voltage has reached its operational level and is active otherwise.

9. The soft-start circuit of claim 8, wherein said circuit further comprises a current limiting resistor connected in series between said second terminal and ground.

10. The soft-start circuit of claim 8, wherein said circuit further comprises a parallel combination of a diode and a current limiting resistor, said parallel combination connected in series between said common terminal and one end of said first capacitor, the other end of said first capacitor being connected to said soft-start terminal, such that said diode enables said first capacitor to charge more rapidly so as to increase the slope of said soft-start voltage for reducing said soft-start interval.

11. The soft-start circuit of claim 8, wherein said alarm signal varies as a function of the duration and current level of said overcurrent condition.

12. The soft-start circuit of claim 11, wherein said soft-start voltage is adjusted as a function of said alarm signal.

13. The soft-start circuit of claim 1, wherein said signal is generated for a predetermined period of time.

14. The soft-start circuit of claim 1, wherein said soft-start circuit includes a protection circuit for adjusting said soft-start voltage linearly as a function of the duration and amplitude of an alarm signal so as to provide a scaled level of protection for said converter.

15. The soft-start circuit of claim 1, wherein said predetermined condition is said output DC voltage reaching a predetermined level.

16. The soft-start circuit of claim 1, wherein said soft-start circuit is for generating a first ramp until said predetermined condition is detected, wherein said soft-start voltage increases linearly, and for generating a second ramp when said predetermined condition is active, said second ramp having a slope substantially greater than said first ramp's slope so as to reduce said soft-start time interval.

* * * * *